United States Patent

[11] 3,599,489

[72] Inventor Thomas N. Marshall, Jr.
 Huntsville, Ala.
[21] Appl. No. 22,320
[22] Filed Mar. 24, 1970
[45] Patented Aug. 17, 1971
[73] Assignee The United States of America as represented by the Administrator of the National Aeronautics and Space Administration

[54] NUCLEAR MASS FLOWMETER
 8 Claims, 2 Drawing Figs.
[52] U.S. Cl. .................................................. 73/194 F, 250/43.5 FC
[51] Int. Cl. .................................................. G01f 1/00
[50] Field of Search ......................................... 73/194 E, 194 F, 194 M; 250/83.6 FT, 43.5 FC, 106 T

[56] References Cited
UNITED STATES PATENTS
1,808,709 6/1931 Blake ............................ 73/194 (F)
2,861,452 11/1958 Morgan ......................... 73/194 (F)
3,176,222 3/1965 Atkisson ....................... 324/61
3,258,964 7/1966 Zessoules ...................... 73/194 (F)

Primary Examiner—Charles A. Ruehl
Attorneys—L. D. Wofford, Jr., Charles C. Wells and John R. Manning ABSTRACT: A flowmeter utilizing a Beta source positioned upstream of a cylindrical capacitor formed by two spaced-apart concentric cylindrical sections. The concentric cylindrical sections form the capacitor electrodes and they are a part of two concentric, inner and outer, tubular members which are mounted in an outer housing that is adapted to be connected into a flow line so that fluid flows through both the inner and outer tubular members. The capacitor electrodes are insulated from the tubular members by means of dielectric ring members connected therebetween. Means are provided for detecting any potential difference between the two electrodes and for evacuating the space between the outer tubular member and the housing.

PATENTED AUG 17 1971

3,599,489

INVENTOR
THOMAS N. MARSHALL, JR.

BY Charles C. Wells

ATTORNEYS

3,599,489

NUCLEAR MASS FLOWMETER

BACKGROUND OF THE INVENTION

1. Field of the Invention

The invention relates to flow meters and in particular the invention is intended for the measurement of mass flow of a nonpolar liquid like, for example, liquid hydrogen.

2. Description of the Prior Art

Prior art flow meters have generally been of the type that measured the flow velocity of the liquid through conduit by placing some type of movable element in the flow. This gave a velocity or volumetric flow measurement. In order to obtain mass flow rates it was necessary to make a separate measurement of the fluid density and combine this with the volumetric flow rates to inferentially arrive at the mass flow rate. These prior art techniques were cumbersome. Also, in monitoring the flow of a fluid the use of a movable element in the flow is not desirable because among other things, the movable element will deteriorate with time changing its characteristics. Another objectionable feature of prior art devices and techniques is that a power source is needed and in many cases complicated readout equipment is required.

SUMMARY OF THE INVENTION

The present invention is a flowmeter capable of measuring the mass flow rates of a nonpolar fluid like liquid hydrogen. The device in general is a cylindrical conduit made up of two spaced apart concentric tubular members having sections that form a cylindrical capacitor. A source of Beta particles is located upstream of the capacitor.

The fluid to be monitored flows through both tubular members and these tubular members are mounted in an outer housing having mounting flanges at each end thereof adapted for connection into a fluid flow line. Adjacent one of their ends the tubular members each have a pair of spaced dielectric ring members mounted therein. Placing these rings in each tubular member forms a cylindrical section which is electrically isolated from the remainder of the tubular member. The electrically isolated section in each tubular member forms one electrode of a cylindrical capacitor. Included are electrical contact means in contact with these isolated sections to permit connection of externally located electrical devices to the electrodes of the cylindrical capacitor.

The Beta source is mounted in the inner tubular member in a position between the cylindrical capacitor and the upstream end of the flowmeter. The positioning of the Beta source is such that it is spaced away from the cylindrical capacitor and also the upstream end of the inner and outer tubular members a distance that is greater than the distance the Beta particles can travel from the Beta source before being absorbed by a nonflowing liquid filling the flowmeter. As fluid flows through the device some of the flowing molecules will acquire a negative electrical charge when a Beta particle attaches thereto. This will in turn result in the inner electrode of the capacitor undergoing a change in potential inversely proportional to the velocity of the fluid, i.e., becoming negative, relative to the outer electrode. The potential difference between the two electrodes can be measured to obtain an indication of the mass flow rate. The potential difference between the two electrodes will be effected by the dielectric constant of any materials positioned between the two electrodes. Inasmuch as there will be fluid flowing between the inner and outer tubular members and since the dielectric constant of the fluid positioned between the two electrodes will vary with the density of the flowing fluid, the fluid flowing between the two electrodes will affect the potential difference between the inner and outer electrodes of the cylindrical capacitor.

If the fluid flow being monitored did not pass between the two electrodes; i.e., was allowed to flow only through the inner tubular member, then only a velocity measurement could be made. By passing the monitored flow through the electrodes the capacitance of the cylindrical capacitor is made dependent upon the density of the flowing fluid and this makes possible a mass measurement.

It is therefore an object of the invention to provide a flowmeter which can function without an external power supply or source of excitation.

A further object is to provide a flowmeter which has no moving parts and does not require complicated readout equipment.

DETAILED DESCRIPTION OF THE INVENTION

Figure 2:
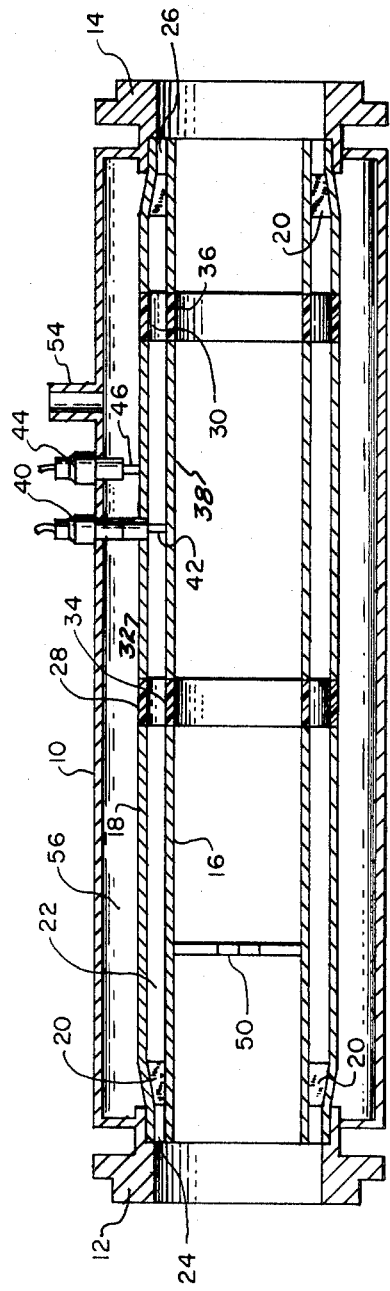
FIG. 2 is a cross-sectional elevational view showing the internal details of the flowmeter.
Figure 1:
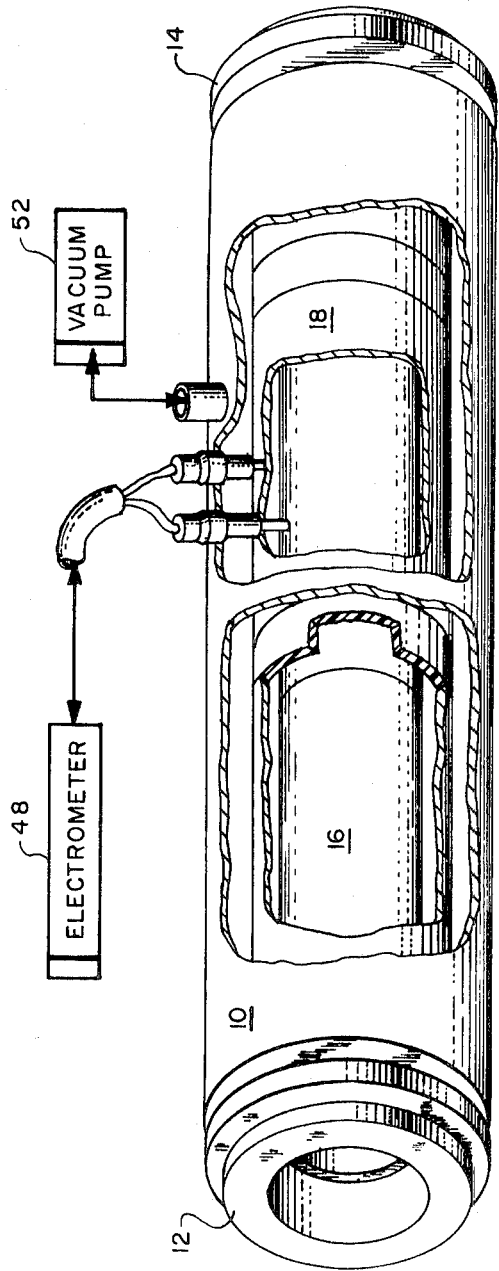
FIG. 1 is a pictorial view, partially broken away and sectioned, illustrating a flowmeter constructed in accordance with the invention.

Referring to FIG. 1 of the drawing, a flowmeter is illustrated pictorially that includes an outer housing 10 having mounting flanges 12 and 14 on the ends thereof for connecting the flowmeter into a fluid flow line (not shown). A pair of tubular members, inner tubular member 16 and outer tubular member 18, are positioned within the outer housing. Outer tubular member 18 is secured in position to mounting flanges 12 and 14 by the use of adhesives, welding or the like. Spokelike spacers 20 are mounted between the inner and outer tubular members near the ends thereof. The purpose of the spacers is to hold the inner tubular member in position and the spacers can be attached by welding, brazing or other suitable means. The space between the inner nd outer tubular members forms an annular chamber 22 which is in communication with the upstream end of the flowmeter by means of annular opening 24. Chamber 22 is in communication with the downstream end of the flowmeter through annular opening 26. It should be noted that the spacers 20 are spokelike and do not interfere to any extent with the flow of fluid from the flow line into the annular chamber 22.

The outer tubular member is provided with a pair of spaced ring members 28 and 30 mounted in the outer tubular member in such manner, by welding or the use of adhesives, as to form an integral part thereof. These ring members are composed of a suitable dielectric material, ceramic for example, so that they electrically isolate a section 32 of the outer tubular member from the remainder of the tubular member. Inner tubular member 16 is provided with dielectric ring members 34 and 36 so as to provide a similarly electrically isolated section 38 in tubular member 16. Sections 32 and 38 of the tubular members form a cylindrical capacitor with these sections being the electrodes of the capacitor. The dielectric would be the liquid that normally fills the space between the two electrodes.

An electrical feed-through 40 mounted in housing 10 extends inwardly through the outer tubular member 18. Feedthrough 40 is composed of an insulating material and has a conductor 42 passing through the center thereof that is in electrical contact with electrode 38. A similar electrical feedthrough 44 is mounted in housing 10 and has a conductor 46 passing through the center thereof that is in electrical contact with electrode 32. Conductors 42 and 46 are connected to an electrometer 48 for reading out any potential difference that exists between electrodes 32 and 38.

A Beta source 50 is positioned within the inner tubular member between the cylindrical capacitor section and the upsteam end of the inner and outer tubular members. Strontium 90 or other radio active substances could be used as a Beta source. The position of the Beta source must be such that its distance from the upstream end of the cylindrical capacitor and also from the annular opening 24 into chamber 22 exceeds the distance that a Beta particle from the Beta source can travel in a nonflowing liquid without being absorbed by the nonflowing fluid. In other words, if the flowmeter is filled with a fluid it is essential that none of the Beta particles be able to enter the annular opening and flow into chamber 22 so as to affect the electrical charge in the area between electrodes 32 and 38. Likewise, in a nonflowing fluid it is necessary that none of the Beta particles reach the internal electrode 38 of the cylindrical capacitor so as to affect the potential difference between the two electrodes of the capacitor. This can be accomplished only if the Beta source is positioned such that in a nonflowing liquid the charge of the Beta particle will be absorbed or neutralized by the liquid before it can reach electrode 38 or the annular chamber 22.

A vacuum pump 52 is connected to housing 10 via inlet 54 for evacuating chamber 56. Chamber 56 is formed by housing 10, mounting flanges 12 and 14, and outer tubular member 18.

As mentioned above the capacitance of the cylindrical capacitor will depend upon the dielectric constant of the fluid positioned between the two electrodes. Further the dielectric constant of the fluid between the electrodes will vary with density of the fluid. This fact is what makes it possible to obtain a mass measurement rather than just a velocity measurement. The velocity measurement could be made with flow only through the inner tubular member. In order to reduce the effect of ambient conditions chamber 56 is evacuated so as to reduce heat transfer between outer tubular member 18 and its surroundings. This would be particularly important when the fluid flow being measured was that of a cryogenic liquid like liquid hydrogen.

In operation the flowmeter would be mounted in a fluid flow line, the electrodes of the cylindrical capacitor connected to an electrometer or other suitable readout device, and chamber 56 evacuated. Liquid flow would enter the device through the upstream end thereof and flow into annular chamber 32 and through tubular member 16. As the liquid passes the Beta source, Beta particles will attach to some of the liquid molecules giving that molecule the charge of an electron, a negative charge. As the negatively charged molecules flow through the electrically isolated section of tubular member 16, that is electrode 38, the electrode acquires a negative charge with respect to electrode 32. The potential difference across the electrodes will vary with changes in flow velocity through tubular member 16 and changes in the dielectric constant of the fluid between the electrodes due to changes in the density of the flowing liquid. These potential differences can be read out on the Electrometer to provide a mass flow measurement.

What I claim is:

1. A device for measuring the mass flow of a nonpolar fluid through a fluid flow line comprising:
   a housing adapted to be connected into said flow line so as to have an upstream and a downstream end and receive a flow of fluid therethrough;
   an outer tubular member mounted in said housing that includes an electrically isolated section that forms a first electrode of a cylindrical capacitor;
   an inner tubular member mounted within said outer cylindrical member that also includes an electrically isolated section that forms a second electrode of a cylindrical capacitor, said second electrode being equal in length to said first electrode and in longitudinal alignment therewith;
   mounting means attached between said inner and outer tubular members for supporting the inner tubular member in a spaced position with respect to the outer tubular member whereby fluid can flow between the inner and outer tubular members as well as through the inner tubular member;
   source means mounted in said inner tubular member for altering the electrical charge of the fluid molecules in the fluid flow through the inner tubular member which in turn results in a difference in electrical potential between said first and second electrodes that is indicative of the mass flow of fluid through the device; and
   detecting means for detecting the difference in electrical potential between said first and second electrodes.

2. The device recited in claim 1 which further includes control means for controlling the atmosphere in the space between said housing and said outer tubular member.

3. The device recited in claim 2 wherein said control means is a vacuum pump connected into the space between said housing and said outer tubular member for pulling a vacuum therein.

4. The device recited in claim 3 wherein said source means emits Beta particles that attach to at least some of the molecules of the flowing fluid resulting in these molecules acquiring the charge of an electron, whereby the flow of such fluid through said second electrode will cause said second electrode to acquire a negative potential with respect to said first electrode.

5. The device recited in claim 4 wherein:
   said source means is mounted in said inner tubular member in a position between the second electrode and the upstream end of said device;
   said source means being spaced away from said first electrode and the upstream end of said inner and outer cylindrical members a distance greater than the distance the Beta particles from said source means can travel in the fluid being monitored when it is not flowing.

6. The device recited in claim 5 wherein said first and second electrodes are each formed by a pair of spaced dielectric ring members mounted in each of said inner and outer tubular members so as to form two spaced and concentric tubular members that are the electrodes of the above recited cylindrical capacitor, the capacitance of said cylindrical capacitor being determined by the dielectric constant of the fluid present between the two electrodes.

7. The device recited in claim 6 wherein said detecting means includes:
   a pair of electrical connectors mounted in said housing and insulated therefrom;
   one of said connectors extending through said first electrode, and being insulated therefrom, so as to be in electrical connection with said second electrode; and
   the other of said connectors being in electrical contact with said first electrode.

8. The device recited in claim 7 which further includes an electrometer connected to said pair of electrical connectors for detecting any electrical potential difference between said first and second electrodes.